US009117033B2

(12) United States Patent
Gao et al.

(10) Patent No.: US 9,117,033 B2
(45) Date of Patent: Aug. 25, 2015

(54) METHOD, DEVICE, AND SYSTEM FOR PACKET TRANSMISSION ON PCIE BUS

(71) Applicant: Huawei Technologies Co., Ltd., Shenzhen (CN)

(72) Inventors: Zhihong Gao, Shenzhen (CN); Ke Li, Shenzhen (CN)

(73) Assignee: Huawei Digital Technologies (Cheng Du) Co. Limited., Chengdu (CN)

( * ) Notice: Subject to any disclaimer, the term of this patent is extended or adjusted under 35 U.S.C. 154(b) by 304 days.

(21) Appl. No.: 13/715,402

(22) Filed: Dec. 14, 2012

(65) Prior Publication Data

US 2013/0103866 A1  Apr. 25, 2013

Related U.S. Application Data

(63) Continuation of application No. PCT/CN2012/070633, filed on Jan. 20, 2012.

(30) Foreign Application Priority Data

Jan. 28, 2011  (CN) .......................... 2011 1 0032172

(51) Int. Cl.
*G06F 13/10* (2006.01)
*G06F 13/20* (2006.01)
(Continued)

(52) U.S. Cl.
CPC ............ *G06F 13/385* (2013.01); *G06F 3/0601* (2013.01); *G06F 3/0628* (2013.01);
(Continued)

(58) Field of Classification Search
CPC ............... G06F 2213/0026; G06F 2213/0028; G06F 2213/0036; G06F 13/105; G06F 13/20; G06F 13/36; G06F 13/38; G06F 13/382; G06F 13/385; G06F 13/4004; G06F 13/4009; G06F 13/4022; G06F 13/4045; G06F 13/4063; G06F 13/4221; G06F 13/423; G06F 13/4265; G06F 13/4282; G06F 3/06–3/0602; G06F 3/0628; H04L 12/4633; H04L 2212/025
See application file for complete search history.

(56) References Cited

U.S. PATENT DOCUMENTS 7,281,062 B1  10/2007 Kuik et al.
7,917,681 B2 *  3/2011 Suzuki et al. ................. 710/312
(Continued)

FOREIGN PATENT DOCUMENTS

CN  1474565 A  2/2004
CN  1476206 A  2/2004
(Continued)

OTHER PUBLICATIONS

Penokie et al.; "Information Technology—SCSI Architecture Model—5 (SAM-5)"; T10 Technical Committee; Revision 0; Sep. 2008; all pages.*

(Continued)

*Primary Examiner* — Ryan Stiglic
(74) *Attorney, Agent, or Firm* — Slater & Matsil, L.L.P.

(57) ABSTRACT

A method, device, and system for packet transmission on the PCIE bus according to the embodiments of the present invention, a SCSI protocol packet is encapsulated to obtain an encapsulated SCSI protocol packet, and the encapsulated SCSI protocol packet is carried in a PCIE data packet, and then the PCIE data packet carrying the encapsulated SCSI protocol packet is transmitted to the receiver device through the PCIE bus. Thereby, transmission of SCSI protocol packets is implemented on the PCIE bus, and any devices interconnected through the PCIE bus can operate each other through SCSI protocol packets with a high data transmission bandwidth and high processing speed, without requiring a specific physical device or adapter to perform protocol conversion.

16 Claims, 1 Drawing Sheet

A transmitter device encapsulates an SCSI protocol packet to obtain an encapsulated SCSI protocol packet, and carries the encapsulated SCSI protocol packet in a PCIE data packet ⟶ 101

The PCIE data packet carrying the encapsulated SCSI protocol packet is sent to the receiver device through the PCIE bus ⟶ 102

(51) Int. Cl.
*G06F 13/42* (2006.01)
*G06F 3/06* (2006.01)
*G06F 13/38* (2006.01)
*G06F 13/40* (2006.01)
*H04L 12/46* (2006.01)

(52) U.S. Cl.
CPC ............... *G06F 13/20* (2013.01); *G06F 13/38* (2013.01); *G06F 13/382* (2013.01); *G06F 13/40* (2013.01); *G06F 13/4004* (2013.01); *G06F 13/4009* (2013.01); *G06F 13/4045* (2013.01); *G06F 13/4063* (2013.01); *G06F 13/4221* (2013.01); *G06F 13/4265* (2013.01); *G06F 13/4282* (2013.01); *H04L 12/4633* (2013.01); *G06F 13/105* (2013.01); *G06F 2213/0026* (2013.01); *G06F 2213/0028* (2013.01); *G06F 2213/0036* (2013.01); *H04L 2212/0025* (2013.01)

(56) References Cited

U.S. PATENT DOCUMENTS

| | | | |
|---|---|---|---|
| 7,929,565 B2* | 4/2011 | Winter | 370/466 |
| 8,463,934 B2* | 6/2013 | Maitra | 709/232 |
| 8,503,468 B2* | 8/2013 | Akyol et al. | 370/419 |
| 8,560,742 B2* | 10/2013 | Tchapda | 710/33 |
| 8,838,867 B2* | 9/2014 | Daniel | 710/313 |
| 8,868,777 B2* | 10/2014 | Maitra | 709/232 |
| 2005/0147117 A1 | 7/2005 | Pettey et al. | |
| 2005/0235013 A1 | 10/2005 | Li et al. | |
| 2006/0126612 A1* | 6/2006 | Sandy et al. | 370/389 |
| 2007/0198763 A1* | 8/2007 | Suzuki et al. | 710/316 |
| 2007/0293984 A1 | 12/2007 | Lin et al. | |
| 2009/0154469 A1* | 6/2009 | Winter | 370/395.53 |
| 2009/0307388 A1* | 12/2009 | Tchapda | 710/33 |
| 2010/0115174 A1* | 5/2010 | Akyol et al. | 710/316 |
| 2010/0161838 A1* | 6/2010 | Daniel | 710/8 |
| 2010/0161870 A1* | 6/2010 | Daniel | 710/314 |
| 2010/0161872 A1* | 6/2010 | Daniel | 710/316 |
| 2011/0153906 A1* | 6/2011 | Suzuki et al. | 710/316 |
| 2011/0202701 A1* | 8/2011 | Maitra | 710/308 |
| 2013/0227093 A1* | 8/2013 | Maitra | 709/220 |
| 2013/0227193 A1* | 8/2013 | Maitra | 710/316 |

FOREIGN PATENT DOCUMENTS

| | | |
|---|---|---|
| CN | 102075410 A | 2/2004 |
| CN | 101645058 A | 2/2010 |
| CN | 101694611 A | 4/2010 |
| CN | 101741878 A | 6/2010 |
| CN | 102075401 B | 8/2013 |

OTHER PUBLICATIONS

First Chinese Office Action of Chinese Application No. 201110032172.3 mailed Feb. 29, 2012, 18 pages. (Partial Translation).

Second Chinese Office Action of Chinese Application No. 201110032172.3 mailed Nov. 2, 2012, 7 pages. (Partial Translation).

International Search Report received in International Application No. PCT/CN2012/070633 mailed Apr. 26, 2012, 3 pages.

Extended European Search Report received in Application No. 12739795.8-1862, Applicant: Huawei Technologies Co., Ltd., mailed Apr. 18, 2013, 6 pages.

* cited by examiner

METHOD, DEVICE, AND SYSTEM FOR PACKET TRANSMISSION ON PCIE BUS

This application is a continuation of International Application No. PCT/CN2012/070633, filed on Jan. 20, 2012, which claims priority to Chinese Patent Application No. 201110032172.3, filed on Jan. 28, 2011, both of which are hereby incorporated by reference in their entireties.

TECHNICAL FIELD

The present invention relates to the field of communication technologies, and in particular, to a method, device, and system for packet transmission on a peripheral component interconnect express (PCIE) bus.

BACKGROUND

The small computer system interface (SCSI) protocol is a protocol suite widely applied in communication between computers and peripheral input/output (I/O) devices (such as hard disks, floppy drives, CD-ROM drives, printers, and scanners), and especially in communication between computers and storage devices. The SCSI protocol generally adopts a client-server architecture. In the SCSI protocol, a client is also known as an initiator (Initiator), and a server is also known as a target (Target). The initiator may send a command request to the target. After the target executes the request, the target returns an execution result to the initiator. Thereby, an interaction process between the initiator and the target is implemented. The command request may include but is not limited to the following instructions: inquiry, used to identify inquiring the target's detail information; Report LUNs, requesting the target to report information about logical unit numbers; Format Unit, requesting the target to perform formatting; READ, sending a read data request to the target; and WRITE, sending a write data request to the target.

In the prior art, data interaction is performed between a host and a storage device; SCSI protocol packets are transmitted between a target and an initiator, for example, serial attached small computer system interface (SAS) packets and Internet small computer system interface (iSCSI) packets are transmitted, and a specific physical device or a specific adapter is required on the initiator and the target to perform protocol conversion. On the initiator, for example, for a SCSI initiator, a SCSI-specific adapter is generally required, and for a SAS initiator, a SAS-specific adapter is required, where the initiator is connected to the target through a SCSI or SAS cable. Correspondingly, on the target, a SCSI-specific adapter or a SAS-specific adapter needs to be configured; for an iSCSI or a fiber channel over Ethernet (FCoE), an Ethernet connection is required, and the target needs to be configured with an Ethernet adapter; for a fiber channel, a fiber channel connection is required, and the target needs to be configured with a fiber channel adapter. Such specific physical devices or specific adapters need to be respectively installed and configured on the initiator and the target to implement protocol conversion and further implement data transmission and interaction between the initiator and the target.

However, for such specific physical devices or specific adapters installed on the initiator and the target, data storage and access are implemented over a network. Due to the bandwidth limitation of the network, the transmission speed of data transmission is seriously affected, dependency on network transmission is strong, and conditions such as network transmission delay also affect the speed of data transmission and storage. Even if a conventional server performs attached storage by means of direct-attached storage (Direct-Attached Storage, DAS for short), a specific physical device or a specific adapter is also required, which inevitably increases the cost of the device or system, and affects the market competitiveness of the device or system.

SUMMARY OF THE INVENTION

Embodiments of the present invention provide a method, device, and system for packet transmission on a PCIE bus, so that SCSI protocol packets can be directly transmitted on the PCIE bus, without requiring a specific physical device or adapter to perform protocol conversion, thereby increasing the transmission speed of packets and reducing the cost of devices.

An embodiment of the present invention provides a method for packet transmission on a PCIE bus. A transmitter device encapsulates a small computer system interface SCSI protocol packet to obtain an encapsulated SCSI protocol packet. The encapsulated SCSI protocol packet is carried in a PCIE data packet and the PCIE data packet is sent to a receiver device through the PCIE bus. The receiver device can execute a corresponding operation according to an instruction of the SCSI protocol packet after obtaining the SCSI protocol packet by parsing the PCIE data packet.

An embodiment of the present invention also provides a device for packet transmission on a PCIE bus. An encapsulating module is configured to encapsulate a SCSI protocol packet to obtain an encapsulated SCSI protocol packet. A sending module is configured to carry the encapsulated SCSI protocol packet in a PCIE data packet and to send the PCIE data packet to a receiver device through the PCIE bus. The receiver device can execute a corresponding operation according to an instruction of the SCSI protocol packet after obtaining the SCSI protocol packet by parsing the PCIE data packet.

An embodiment of the present invention also provides a system for packet transmission on a PCIE bus, including a transmitter device and a receiver device.

The transmitter device includes an encapsulating module, which is configured to encapsulate a small computer system interface SCSI protocol packet to obtain an encapsulated SCSI protocol packet. A sending module is configured to carry the encapsulated SCSI protocol packet in a transaction layer protocol TLP packet of a PCIE data packet and to send the PCIE data packet to the receiver device through the PCIE bus.

The receiver device includes a parsing module that is configured to parse the PCIE data packet to obtain the SCSI protocol packet and an executing module that is configured to execute a corresponding operation according to an instruction of the SCSI protocol packet.

By using the method, device, and system for packet transmission on the PCIE bus according to the embodiments of the present invention, a SCSI protocol packet is encapsulated to obtain an encapsulated SCSI protocol packet, and the encapsulated SCSI protocol packet is carried in a PCIE data packet, and then the PCIE data packet carrying the encapsulated SCSI protocol packet is transmitted to the receiver device through the PCIE bus. Thereby, transmission of SCSI protocol packets is implemented on the PCIE bus, and any devices interconnected through the PCIE bus can operate each other through SCSI protocol packets with a high data transmission bandwidth and high processing speed, without requiring a specific physical device or adapter to perform protocol conversion. When applied on a storage device, the embodiments of the present invention may be independent of the network-attached storage mode, which reduces the impact of network transmission delay on data access and storage and thereby increases the transmission speed of packets. For example, because data transmission is implemented through the system bus, and no physical cables or specific adapters are needed, the cost of devices may be reduced. In addition, because SCSI protocol packets are transferred through the PCIE bus, any two devices interconnected through the PCIE bus can operate each other through SCSI protocol packets, for example, a storage device may be directly connected to a computer through a SCSI interface, without the need of defining various private protocols to perform mutual operations, thereby improving the universal applicability of the storage device.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF ILLUSTRATIVE EMBODIMENTS

To make the objectives, technical solutions, and advantages according to the embodiments of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
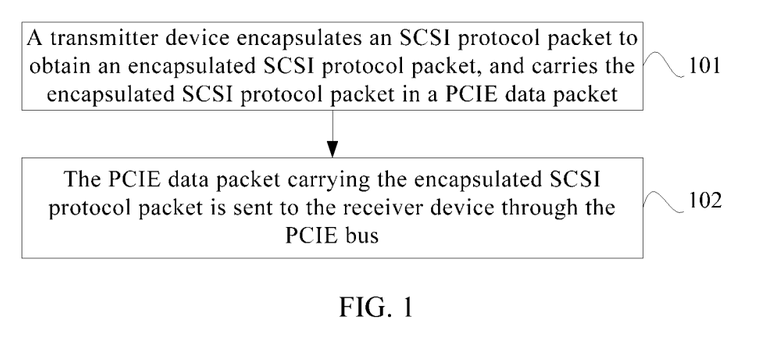
FIG. 1 is a flowchart of a method for packet transmission on a PCIE bus according to an embodiment of the present invention.

FIG. 1 is a flowchart of a method for packet transmission on a PCIE bus according to an embodiment of the present invention. As shown in FIG. 1, the method includes a number of steps.

Step 101: A transmitter device encapsulates a SCSI protocol packet to obtain an encapsulated SCSI protocol packet, and carries the encapsulated SCSI protocol packet in a PCIE data packet.

The "encapsulation" in the embodiment is actually a practice of mapping a SCSI protocol packet to a PCIE data packet.

The encapsulated SCSI protocol packet may be carried in a transaction layer protocol (Transaction Layer Protocol, TLP for short) packet of the PCIE data packet. The specific location of the SCSI protocol packet in the PCIE data packet may be as shown in Table 1, which illustrates a schematic diagram of the format of the PCIE data packet provided in the embodiment of the present invention.

TABLE 1

| Start of frame | DLLP header | TLP header | TLP packet carrying the encapsulated SCSI protocol packet | ECRC | LCRC | End of frame |
|---|---|---|---|---|---|---|

In many cases, the transmitter device may be caused to encapsulate a SCSI protocol packet and carry the encapsulated SCSI protocol packet in a PCIE data packet. For example, if a computer application or a CPU wishes to perform a write/read operation for a device through a PCIE bus, the write/read request is converted into a SCSI write/read command and encapsulated, and then carried in a PCIE data packet. Alternatively, after a device connected to a computer through a PCIE bus receives a request packet sent by the computer through the PCIE bus, if a response packet needs to be returned, the device converts the response packet into a SCSI response packet and encapsulates the SCSI response packet, and then carries the encapsulated SCSI response packet in a PCIE data packet.

If the encapsulated SCSI protocol packet carried in the TLP packet of the PCIE data packet is a command request packet, the transmitter device is an initiator, and the receiver device is a target. In this case, the TLP packet carrying the encapsulated SCSI protocol packet may include but is not limited to what is shown in Table 2.

TABLE 2

| Byte | 0 | | | | 1 | 2 | 3 |
|---|---|---|---|---|---|---|---|
| 0 | Op | R | W | ATTR | CDB Length | Reserved | |
| 4 | SCSI Command Descriptor Block (CDB) | | | | | | |
| 16 | | | | | | | |
| 20 | LUN | | | | | | |
| 24 | | | | | | | |
| 28 | Read-Data Length (Optional) | | | | | | |
| 32 | Read Buffer Address (Optional) | | | | | | |
| 36 | Write-Data Length (Optional) | | | | | | |
| 40 | Write Buffer Address (Optional) | | | | | | |

The TLP packet carrying the encapsulated SCSI protocol packet (hereinafter abbreviated to the SCSI-TLP packet) may include: command tag (byte 0), command descriptor block length (CDB Length), command descriptor block (CDB), logical unit number (Logical Unit Number, LUN for short), read data length (Read-Data Length), read buffer address (Read Buffer Address), write data length (Write-Data Length), and write buffer address (Write Buffer Address).

It should be specially noted that for ease of understanding of each field, in this embodiment and other embodiments of the present invention, more detailed examples of the SCSI fields encapsulated in the TLP packet will be provided, but the scope of the embodiments of the present invention is not limited thereto. After reading this solution, persons of ordinary skill in the art may definitely make adaptive changes to the specific implementation according to their requirements. For example, the Op field indicating an operation type may be three bits, namely, bits 0-2. If necessary, the Op field may be extended to include four bits, namely, bits 0-3. Similarly, its location may start from other bytes than byte 0, for example, it may be located in bits 2-4. For another example, the command tag (byte 0) may be located in byte 0 or byte 1 or byte 4, while the CDB length may be adjacent to the command tag (byte 0) or not. The LUN field may be located before Read-Data Length (Optional) or located between Write-Data Length (Optional) and Read Buffer Address (Optional).

The fields are respectively described hereunder.

1. Command tag (byte 0). The Command tag is byte 0. This byte includes bits 0-7 as described now.

Bits 0-2 (Op) in this byte indicate the operation type of the encapsulated SCSI-TLP packet. Herein, the value is set to 1, indicating that the SCSI-TLP packet is a SCSI command request packet.

Bit 3 and bit 4 in this byte are a command indicator, used to indicate whether the encapsulated SCSI command request packet is a read request or a write request. When the command is a read request, bit 3 (R) in this byte is set to 1. In this case, the Read-Data Length field and the Read Buffer Address field are valid. When the command is a write request, bit 4 (W) in this byte is set to 1. In this case, the Write-Data Length field and the Write Buffer Address field are valid.

Bits 5-7 (ATTR) in this byte indicate the attribute of the current task, which may also be understood as the priority of the task indicated by the current encapsulated SCSI protocol packet. That is, the execution order of task is decided by the attribute of the current task, and tasks having a high priority but arriving later may be executed earlier. For details, reference may be made to another standard SCSI architecture, 5[SCSI Architecture Model-5, SAM5 for short] in the SCSI standard series.

0: Untagged
1: Simple
2: Ordered
3: Head of Queue
4: ACA
5-7: Reserved

2. Command descriptor block length (CDB Length). The first byte byte 1 describes the length of a command descriptor block included in the SCSI-TLP packet.

3. Command descriptor block (CDB). This byte describes the command descriptor block information of a specific command indicated by the SCSI protocol packet. For details, reference may be made to the primary command set [SCSI Primary Commands-4, SPC4 for short] in the SCSI standard series.

4. Logical unit number (LUN). In a LUN area, a 64-bit logical unit number may be used to uniquely identify a LUN. The LUN is a specific operation object of the SCSI command request packet.

5. Read data length (Read-Data Length). When the R tag (bit 3) in the command tag field (byte 0) is set to 1, the read data length field is valid. The 32-bit field indicates the length of data that the initiator wishes to obtain from the target (measured in bytes). After the data transmission is complete, the target notifies the initiator of the length of data actually transmitted. It should be noted that this field is an optional field.

6. Read buffer address (Read Buffer Address). When the R tag (bit 3) in the command tag field (byte 0) is set to 1, the read buffer address field is valid. The 32-bit field indicates a read buffer address. The target sends read data to the read buffer. It should be noted that this field is an optional field.

7. Write data length (Write-Data Length). When the W tag (bit 4) in the command tag field (byte 0) is set to 1, the write data length field is valid. The 32-bit field indicates the length of data that the initiator wishes to write to the target (measured in bytes). After the data transmission is complete, the target notifies the initiator of the length of data actually written. It should be noted that this field is an optional field.

8. Write buffer address (Write Buffer Address). When the W tag (bit 4) in the command tag field (byte 0) is set to 1, the write buffer address field is valid. The 32-bit field indicates a write buffer address. The initiator writes data to the write buffer. The target obtains the written data from the write buffer. It should be noted that this field is an optional field.

If the encapsulated SCSI protocol packet carried in the TLP packet of the PCIE data packet is a command response packet, the transmitter device is a target, and the receiver device is an initiator. In this case, the SCSI-TLP packet may include but is not limited to what is shown in Table 3.

TABLE 3

| Byte | 0 | | | | | 1 | 2 | 3 |
|---|---|---|---|---|---|---|---|---|
| 0 | Op | r | R | w | W | Sense Length | Reserved | Status |
| 4 | Read Residual Count (optional) | | | | | | | |
| 8 | Write Residual Count (optional) | | | | | | | |
| 12 | Sense Data (Optional) | | | | | | | |
| n | | | | | | | | |

The SCSI-TLP packet may include: command tag, sense data length (Sense Length), status (Status), read residual count (Read Residual Count), write residual count (Write Residual Count), and sense data (Sense Data).

The fields are respectively described hereunder.

1. Command tag (byte 0). This byte includes bits 0-7 as described now.

Bits 0-2 (Op) in this byte indicate the operation type of the encapsulated SCSI-TLP packet. Herein, the value is set to 2, indicating that the SCSI-TLP packet is a SCSI command response packet.

Bit 3 is reserved.

Bit 4 (r) is a read overflow indicator. When this bit is set to 1, it indicates read overflow. In this case, the read residual count (Read Residual Count) field is valid. When the initiator initiates a read operation, overflow occurs if the length of data returned by the target exceeds the read buffer length. The read residual count field indicates the length of excess data.

Bit 5 (R) is a read underflow indicator. When this bit is set to 1, it indicates read underflow. In this case, the read residual count (Read Residual Count) field is valid. When the initiator initiates a read operation, underflow occurs if the length of data returned by the target is less than the read data length specified by the initiator. The read residual count field indicates the length of lacking data.

Bit 6 (w) is a write overflow indicator. When this bit is set to 1, it indicates write overflow. In this case, the write residual count (Write Residual Count) field is valid. When the initiator initiates a write operation, overflow occurs if the write data length exceeds the length specified by the CDB. The write residual count field indicates the length of excess data.

Bit 7 (W) is a write underflow indicator. When this bit is set to 1, it indicates write underflow. In this case, the write residual count (Write Residual Count) field is valid. When the initiator initiates a write operation, underflow occurs if the write data length is less than the length specified by the CDB. The write residual count field indicates the length of lacking data.

2. Sense data length (Sense Length). This field indicates the length of sense data in the SCSI-TLP packet.

3. Status (Status). The status field indicates the status of the SCSI command.

The states defined in [SAM5] include:
0x00 GOOD
0x02 CHECK CONDITION
0x04 CONDITION MET
0x08 BUSY
0x18 RESERVATION CONFLICT
0x28 TASK SET FULL
0x30 ACA ACTIVE
0x40 TASK ABORTED 4. Read residual count (Read Residual Count). This field is valid when bit 4 (r) or bit 5 (R) in the command tag field is set to 1.

5. Write residual count (Write Residual Count). This field is valid when bit 6 (w) or bit 7 (W) in the command tag field is set to 1.

6. Sense data (Sense Data). This field describes detailed information about sense data. This field is auxiliary to the Status field. It provides more detailed returned information about the status for a user after the SCSI command is executed. For example, if the CHECK CONDITION state is returned in the Status field, the Sense Data field may be used to return more detailed information, for example, Not READY (the LUN is not ready and is currently unavailable), MEDIUM ERROR, HARDWARE ERROR, ILLEGALE REQUEST (illegal request), and DATA PROTECT (protected data is accessed). Detailed descriptions are provided in SPC4.

If the encapsulated SCSI protocol packet in the TLP packet of the PCIE data packet is a SCSI task management request packet, the transmitter device is an initiator, and the receiver device is a target. In this case, the SCSI-TLP packet may include but is not limited to what is shown in Table 4.

TABLE 4

| Byte | 0 | 1 | 2 | 3 |
|---|---|---|---|---|
| 0 | Op | Reserved | Function | Reserved |
| 4 | | Logical Unit Number (LUN) | | |
| 8 | | | | |

The SCSI-TLP packet may include but is not limited to: command tag, function (Function), and LUN.

The fields are respectively described hereunder.

1. Command tag (byte 0). This byte includes bits 0-7 as described now.

Bits 0-2 (Op) in this byte indicate the operation type of the encapsulated SCSI-TLP packet. Herein, the value is set to 3, indicating that the SCSI-TLP packet is a SCSI task management request packet.

Bits 3-7 are reserved.

2. Function (Function). This field defines management of a task requested by the initiator. For the detailed description of task management, reference may be made to [SAM5]. The following lists different task management request packets.

1: ABORT TASK

2: ABORT TASK SET

3: CLEAR ACA

4: CLEAR TASK SET

5: I_T NEXUS RESET

6: LOGICAL UNIT RESET

7: QUERY TASK

8: QUERY TASK SET

9: QUERY ASYNCHRONOUS EVENT

3. Logical unit number (LUN). The LUN field uses a 64-bit logical unit number to uniquely identify a LUN.

If the encapsulated SCSI protocol packet carried in the TLP packet of the PCIE data packet is a SCSI task management response packet, the transmitter device is a target, and the receiver device is an initiator. In this case, the SCSI-TLP packet may include but is not limited to what is shown in Table 5.

TABLE 5

| Byte | 0 | 1 | 2 | 3 |
|---|---|---|---|---|
| 0 | Op | a | Rsp | Additional Response Info |

The SCSI-TLP packet may include but is not limited to: command tag and additional response information (Additional Response Info).

The fields are respectively described hereunder.

1. Command tag (byte 0). This bite includes bits 0-7 as described hereunder.

Bits 0-2 (Op) in this byte indicate the operation type of the encapsulated SCSI-TLP packet. Herein, the value is set to 4, indicating that the SCSI-TLP packet is a SCSI task management response.

Bit 3 (a) is an additional response information indicator. When this bit is set to 1, the additional response information (Additional Response Info) field is valid.

Bits 4-7 indicate a response result, as detailed hereunder.

0—The task management request is complete.

1—The task management succeeds.

2—The task management request is rejected.

3—Incorrect logical unit number.

4—Task transmission error or target error.

Other values are reserved.

According to the data packet format of the SCSI task management request packet shown in Table 4 and especially the task management content indicated by the function (Function), it may be seen that the response result is actually the execution result of the SCSI task management request packet.

2. Additional response information (Additional Response Info). This field is valid when bit 3 (a) of byte 0 is set to 1. The additional response information field may provide additional information about a task requested by the task management function.

If the encapsulated SCSI protocol packet carried in the TLP packet of the PCIE data packet is a SCSI asynchronous event packet, the transmitter device is a target, and the receiver device is an initiator. In this case, the SCSI-TLP packet may include but is not limited to what is shown in Table 6.

TABLE 6

| Byte | 0 | 1 | 2 | 3 |
|---|---|---|---|---|
| 0 | Op | Reserved | Sense Length | |
| 4 | | Lun or Reserved | | |
| 8 | | | | |
| 12 | | Sense Data | | |
| n | | | | |

The SCSI-TLP packet may include but is not limited to: command tag, sense data length, and sense data.

The fields are respectively described hereunder.

The SCSI asynchronous event uses sense data (Sense Data) to report an abnormal case that occurs in the target. For example, the abnormal case may be an abnormal case that occurs within a predetermined time. Whether the SCSI asynchronous event function is enabled is decided by a parameter on the SCSI control mode page. Reference may be made to [SPC4] for details.

1. Command tag (byte 0). Bits 0-2 (Op) in this byte indicate the operation type of the encapsulated SCSI-TLP packet. Herein, the value is set to 5, indicating that the SCSI-TLP packet is a SCSI asynchronous event packet.

2. Sense data length (Sense Length). This field indicates the length of sense data in the SCSI-TLP packet.

3. Sense data (Sense Data). This field describes detailed information about sense data. This field is used to provide more detailed information for the initiator, such as a specific asynchronous event. Detailed descriptions are provided in SPC4.

It should be noted that this embodiment provides only a specific form of implementation, which is not intended to limit the content to be protected in the embodiment. All forms of the SCSI-TLP packet obtained by persons skilled in the art according to the spirit of the present invention shall fall within the protection scope of the present invention.

Step 102: Through the PCIE bus, the transmitter device sends the PCIE data packet carrying the encapsulated SCSI protocol packet to the receiver device, so that the receiver device executes a corresponding operation according to an instruction of the SCSI protocol packet after obtaining the SCSI protocol packet by parsing the PCIE data packet.

The corresponding operation executed by the receiver device according to the instruction of the SCSI protocol packet includes: sending the SCSI protocol packet to a corresponding LUN for processing, where the corresponding LUN is the logical unit number LUN of a specific operation object of the SCSI command request packet.

By using the method for packet transmission on the PCIE bus according to the embodiment of the present invention, an encapsulated SCSI protocol packet is carried in a PCIE data packet, and then the PCIE data packet carrying the encapsulated SCSI protocol packet is transmitted to the receiver device through the PCIE bus. Thereby, transmission of SCSI protocol packets is implemented on the PCIE bus, and any devices interconnected through the PCIE bus can operate each other through SCSI protocol packets with a high data transmission bandwidth and high processing speed, without requiring a specific physical device or adapter to perform protocol conversion. Therefore, the transmission speed of packets is increased, and the cost of devices is reduced. In addition, because SCSI protocol packets are transferred through the PCIE bus, any two devices interconnected through the PCIE bus can operate each other through SCSI protocol packets, without the need of defining various private protocols to perform mutual operations, so that the universal applicability is good.

Figure 2:
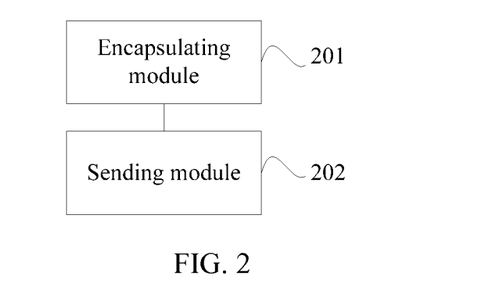
FIG. 2 is a schematic structural diagram of a device for packet transmission on a PCIE bus according to an embodiment of the present invention.

FIG. 2 is a schematic structural diagram of a device for packet transmission on a PCIE bus according to an embodiment of the present invention. The device is a specific executor of the preceding method. Therefore, the content of the method embodiment is incorporated into the device embodiment by reference, and no repeated description is provided herein. As shown in FIG. 2, the device includes an encapsulating module 201 and a sending module 202. The encapsulating module 201 is configured to encapsulate a small computer system interface SCSI protocol packet to obtain an encapsulated SCSI protocol packet. The sending module 202 is configured to carry the encapsulated SCSI protocol packet in a PCIE data packet, and send the PCIE data packet to a receiver device through the PCIE bus, so that the receiver device executes a corresponding operation according to an instruction of the SCSI protocol packet after obtaining the SCSI protocol packet by parsing the PCIE data packet.

The sending module 202 is specifically configured to carry the encapsulated SCSI protocol packet in a TLP packet of the PCIE data packet.

If the SCSI protocol packet is a SCSI command request packet, the encapsulating module 201 includes a first encapsulating unit, which is configured to use an operation type to indicate that the SCSI protocol packet is a SCSI command request packet use a command descriptor block CDB to indicate a specific command of the SCSI command request packet and to use a logical unit number LUN to indicate a specific operation object of the SCSI command request packet.

Further, the encapsulating module 201 may further include a second encapsulating unit, which is configured to use a command indicator to indicate that the SCSI command request packet is a read request or a write request to use a read data length to indicate a length of data that an initiator expects to obtain from a target to use a read buffer address to instruct the target to send data to a read buffer to use a write data length to indicate a length of data that the initiator expects to write to the target and to use a write buffer address to instruct the target to read data from a write buffer.

If the SCSI protocol packet is a SCSI command response packet, the encapsulating module 201 may include a third encapsulating unit, configured to use an operation type to indicate that the SCSI protocol packet is a SCSI command response packet and to use a status indicator to indicate a completion status of a SCSI command request packet.

Further, the encapsulating module 201 may further include a fourth encapsulating unit, configured to use an overflow indicator to indicate that data overflows to use a residual count to indicate a length of overflowed data and to use sense data to indicate additional data that the target feeds back to the initiator.

If the SCSI protocol packet is a SCSI task management request packet, the encapsulating module 201 may include a fifth encapsulating unit, configured to use an operation type to indicate that the SCSI protocol packet is a SCSI task management request packet to use a function to indicate a task management content requested by the initiator and to use a logical unit number LUN to indicate a specific operation object.

If the SCSI protocol packet is a SCSI task management response packet, the encapsulating module 201 may include a sixth encapsulating unit, configured to use an operation type to indicate that the SCSI protocol packet is a SCSI task management response packet and to use a response result to indicate an execution result of a SCSI task management request packet.

If the SCSI protocol packet is a SCSI asynchronous event packet, the encapsulating module 201 may include a seventh encapsulating unit, configured to use an operation type to indicate that the SCSI protocol packet is a SCSI asynchronous event and to use sense data to indicate an abnormal status of the target within a predetermined time.

If the SCSI protocol packet is a SCSI command request packet, or a SCSI task management request packet, or a SCSI asynchronous event packet, the preceding device is an initiator. If the SCSI protocol packet is a SCSI command response packet or a SCSI task management response packet, the preceding device is a target.

Figure 3:
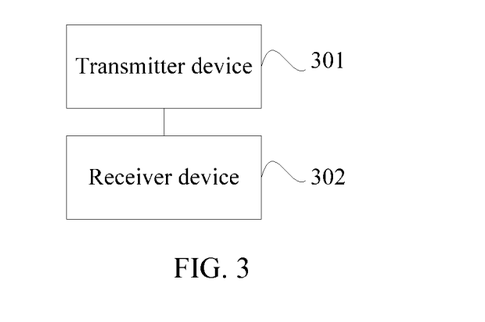
FIG. 3 is a schematic structural diagram of a system for packet transmission on a PCIE bus according to an embodiment of the present invention.

FIG. 3 is a schematic structural diagram of a system for packet transmission on a PCIE bus according to an embodiment of the present invention. As shown in FIG. 3, the system includes a transmitter device 301 and a receiver device 302. The transmitter device 301 includes an encapsulating module and a sending module. The encapsulating module is configured to encapsulate a small computer system interface SCSI protocol packet to obtain an encapsulated SCSI protocol packet. The sending module is configured to carry the encapsulated SCSI protocol packet in a transaction layer protocol TLP packet of a PCIE data packet and to send the PCIE data packet to the receiver device through the PCIE bus. The receiver device 302 includes a parsing module. Which is configured to parse the PCIE data packet to obtain the SCSI protocol packet and an executing module, which is configured to execute a corresponding operation according to an instruction of the SCSI protocol packet.

It should be noted that in the prior art, the transmitter device 301 and the receiver device 302 may be, but is not limited to, a computer and a related external device. Other specific devices connected through the PCIE bus may also act as the transmitter device 301 or the receiver device 302.

By using the devices and system for packet transmission on the PCIE bus according to the embodiment of the present invention, an encapsulated SCSI protocol packet is carried in a PCIE data packet, and then the PCIE data packet carrying the encapsulated SCSI protocol packet is transmitted to the receiver device through the PCIE bus. Thereby, transmission of SCSI protocol packets is implemented on the PCIE bus, and any devices interconnected through the PCIE bus can operate each other through SCSI protocol packets with a high data transmission bandwidth and high processing speed, without requiring a specific physical device or adapter to perform protocol conversion. Therefore, the network transmission delay is reduced, the transmission speed of packets is increased, and the cost of devices is reduced. In addition, because SCSI protocol packets are transferred through the PCIE bus, any two devices interconnected through the PCIE bus can operate each other through SCSI protocol packets, without the need of defining various private protocols to perform mutual operations, so that the universal applicability is good.

In addition, for a storage device according to this solution, the PCIE bus adopts the principle of a PCI bus, but abandons a parallel shared bus. The prevalent point-to-point serial connection in the art is adopted, and each device has its dedicated connection. There is no need to request a bandwidth from the whole bus, and the data transmission rate can be raised to a very high rate, reaching a high bandwidth that the PCI is unable to provide. Therefore, the situation where multitudinous interfaces exist on a motherboard and cannot be unified comes to an end, and the bus standards for the motherboard are unified, That is, all devices may be connected through the PCIE bus, which simplifies the design of the motherboard and reduces unnecessary trouble.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as a ROM, a RAM, a magnetic disk, or an optical disk, and the like.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the spirit and scope of the technical solutions of the embodiments of the present invention.

What is claimed is:

1. A method for packet transmission on a peripheral component interconnect express PCIE bus, the method comprising:
   encapsulating, by a transmitter device, a small computer system interface SCSI protocol packet to obtain an encapsulated SCSI protocol packet;
   carrying the encapsulated SCSI protocol packet in a transaction layer protocol (TLP) packet of a PCIE data packet; and
   sending the PCIE data packet to a receiver device through the PCIE bus, so that the receiver device can execute a corresponding operation according to an instruction of the SCSI protocol packet after obtaining the SCSI protocol packet by parsing the PCIE data packet;
   wherein if the SCSI protocol packet is a SCSI command request packet, the transmitter device is an initiator, the receiver device is a target; and encapsulating the SCSI protocol packet comprises:
      using an operation type to indicate that the SCSI protocol packet is the SCSI command request packet,
      using a command descriptor block (CDB) to indicate a specific command of the SCSI command request packet, and
      using a logical unit number (LUN) to indicate a specific operation object of the SCSI command request packet.

2. The method according to claim 1, wherein encapsulating the SCSI protocol packet further comprises:
   using a command indicator to indicate that the SCSI command request packet is a read request or a write request; and
   using a read buffer address to instruct the target to send data to a read buffer; or
   using a write buffer address to instruct the target to read data from a write buffer.

3. The method according to claim 2, wherein encapsulating the SCSI protocol packet further comprises:
   using a command indicator to indicate that the SCSI command request packet is a read request or a write request; and
   using a read data length to indicate a length of data that the initiator expects to obtain from the target; or using a write data length to indicate a length of data that the initiator expects to write to the target.

4. The method according to claim 1, wherein, if the SCSI protocol packet is a SCSI command response packet, the transmitter device is a target, the receiver device is an initiator, and the encapsulating the SCSI protocol packet further comprises:
   using an operation type to indicate that the SCSI protocol packet is a SCSI command response packet; and
   using a status indicator to indicate a completion status of the SCSI command request packet.

5. The method according to claim 4, wherein encapsulating the SCSI protocol packet further comprises:
   using an overflow indicator to indicate that data overflows;
   using a residual count to indicate a length of overflowed data; and
   using sense data to indicate additional data that the target feeds back to the initiator.

6. The method according to claim 1, further comprising executing, by the receiver device, the corresponding operation according to the instruction of the SCSI protocol packet after obtaining the SCSI protocol packet by parsing the PCIE data packet.

7. A method for packet transmission on a peripheral component interconnect express (PCIE) bus, the method comprising:
   encapsulating, by a transmitter device, a small computer system interface SCSI protocol packet to obtain an encapsulated SCSI protocol packet;

carrying the encapsulated SCSI protocol packet in a transaction layer protocol (TLP) packet of a PCIE data packet; and sending the PCIE data packet to a receiver device through the PCIE bus, so that the receiver device can execute a corresponding operation according to an instruction of the SCSI protocol packet after obtaining the SCSI protocol packet by parsing the PCIE data packet;

wherein, if the SCSI protocol packet is a SCSI task management request packet, the transmitter device is an initiator, the receiver device is a target, and the encapsulating a SCSI protocol packet comprises:

using an operation type to indicate that the SCSI protocol packet is a SCSI task management request packet, using a function to indicate a task management content requested by the initiator, and using a logical unit number (LUN) to indicate a specific operation object.

8. The method according to claim 7, wherein, if the SCSI protocol packet is a SCSI task management response packet, the transmitter device is a target, the receiver device is the initiator, and the encapsulating the SCSI protocol packet comprises:

using an operation type to indicate that the SCSI protocol packet is a SCSI task management response packet; and using a response result to indicate an execution result of a SCSI task management request packet.

9. The method according to claim 8, wherein, if the SCSI protocol packet is a SCSI task management response packet, the transmitter device is a target, the receiver device is the initiator, and the encapsulating the SCSI protocol packet further comprises:

using an operation type to indicate that the SCSI protocol packet is a SCSI task management response packet;

using an additional response information indicator to indicate whether additional response information is valid; and using the additional response information to provide additional information about a task requested by a task management function.

10. A method for packet transmission on a peripheral component interconnect express (PCIE) bus, the method comprising:

encapsulating, by a transmitter device, a small computer system interface (SCSI) protocol packet to obtain an encapsulated SCSI protocol packet;

carrying the encapsulated SCSI protocol packet in a transaction layer protocol (TLP) packet of a PCIE data packet; and sending the PCIE data packet to a receiver device through the PCIE bus, so that the receiver device can execute a corresponding operation according to an instruction of the SCSI protocol packet after obtaining the SCSI protocol packet by parsing the PCIE data packet;

wherein if the SCSI protocol packet is a SCSI asynchronous event packet, the transmitter device is a target, the receiver device is an initiator, and the encapsulating a SCSI protocol packet comprises:

using an operation type to indicate that the SCSI protocol packet is a SCSI asynchronous event, and using sense data to indicate an abnormal status of the target.

11. A device for packet transmission on a peripheral component interconnect express (PCIE) bus, the device comprising:

a non-transitory computer-readable medium storing program modules executable by a processor, the modules including;

an encapsulating module configured to encapsulate a small computer system interface SCSI protocol packet to obtain an encapsulated SCSI protocol packet; and a sending module configured to carry the encapsulated SCSI protocol packet in a transaction layer protocol (TLP) packet of a PCIE data packet and to send the PCIE data packet to a receiver device through the PCIE bus, so that the receiver device can execute a corresponding operation according to an instruction of the SCSI protocol packet after obtaining the SCSI protocol packet by parsing the PCIE data packet;

wherein, if the SCSI protocol packet is a SCSI command request packet, the device for packet transmission on a PCIE bus is an initiator, and the encapsulating module comprises:

a first encapsulating unit configured to use an operation type to indicate that the SCSI protocol packet is a SCSI command request packet, to use a command descriptor block (CDB) to indicate a specific command of the SCSI command request packet, and to use a logical unit number (LUN) to indicate a specific operation object of the SCSI command request packet.

12. The device according to claim 11, wherein the encapsulating module further comprises a second encapsulating unit, which is configured to use a command indicator to indicate that the SCSI command request packet is a read request or a write request, to use a read data length to indicate a length of data that the device expects to obtain from a target, to use a read buffer address to instruct the target to send data to a read buffer, to use a write data length to indicate a length of data that the device expects to write to the target, and to use a write buffer address to instruct the target to read data from a write buffer.

13. The device according to claim 11, wherein, if the SCSI protocol packet is a SCSI command response packet, the device for packet transmission on the PCIE bus is a target, and the encapsulating module further comprises:

a third encapsulating unit configured to use an operation type to indicate that the SCSI protocol packet is a SCSI command response packet, and to use a status indicator to indicate a completion status of a SCSI command request packet; and a fourth encapsulating unit configured to use an overflow indicator to indicate that data overflows; to use a residual count to indicate a length of overflowed data, and to use sense data to indicate additional data that the device feeds back to an initiator.

14. A device for packet transmission on a peripheral component interconnect express (PCIE) bus, the device comprising:

a non-transitory computer-readable medium storing program modules executable by a processor, the modules including:

an encapsulating module configured to encapsulate a small computer system interface (SCSI) protocol packet to obtain an encapsulated SCSI protocol packet; and a sending module configured to carry the encapsulated SCSI protocol packet in a transaction layer protocol, TLP, packet of a PCIE data packet and to send the PCIE data packet to a receiver device through the PCIE bus, so that the receiver device can execute a corresponding operation according to an instruction of the SCSI protocol packet after obtaining the SCSI protocol packet by parsing the PCIE data packet;

wherein if the SCSI protocol packet is a SCSI task management request packet, the device for packet transmission on a PCIE bus is an initiator and the encapsulating module comprises:

a first encapsulating unit configured to use an operation type to indicate that the SCSI protocol packet is a SCSI task management request packet, to use a function to indicate a task management content requested by the device, and to use a logical unit number (LUN) to indicate a specific operation object.

15. The device according to claim 14, wherein, if the SCSI protocol packet is a SCSI task management response packet, the device for packet transmission on the PCIE bus is a target and the encapsulating module further comprises:

a second encapsulating unit configured to use an operation type to indicate that the SCSI protocol packet is a SCSI task management response packet and to use a response result to indicate an execution result of a SCSI task management request packet.

16. A device for packet transmission on a peripheral component interconnect express (PCIE) bus, the device comprising:

a non-transitory computer-readable medium storing program modules executable by a processor, the modules including:

an encapsulating module configured to encapsulate a small computer system interface SCSI protocol packet to obtain an encapsulated SCSI protocol packet; and a sending module configured to carry the encapsulated SCSI protocol packet in a transaction layer protocol, TLP, packet of a PCIE data packet and to send the PCIE data packet to a receiver device through the PCIE bus so that the receiver device can execute a corresponding operation according to an instruction of the SCSI protocol packet after obtaining the SCSI protocol packet by parsing the PCIE data packet;

wherein if the SCSI protocol packet is a SCSI asynchronous event packet, the device for packet transmission on the PCIE bus is a target and the encapsulating module comprises:

a encapsulating unit configured to use an operation type to indicate that the SCSI protocol packet is a SCSI asynchronous event and to use sense data to indicate an abnormal status of the device.

* * * * *